United States Patent [19]

Verner Michael L.

[11] Patent Number: 4,691,959

[45] Date of Patent: Sep. 8, 1987

[54] REFUSE PICKUP AND COMPACTOR BODY

[75] Inventor: Verner Michael L., Norwalk, Calif.

[73] Assignee: Maxon Industries, Inc., Huntington Park, Calif.

[21] Appl. No.: 919,013

[22] Filed: Oct. 15, 1986

Related U.S. Application Data

[62] Division of Ser. No. 754,521, Jul. 12, 1985, Pat. No. 4,648,775.

[51] Int. Cl.[4] .................... B60P 1/00

[52] U.S. Cl. .................... 296/184; 296/183; 298/1 B

[58] Field of Search .................... 296/184, 183; 298/1 B; 414/512, 513, 492

[56] References Cited

U.S. PATENT DOCUMENTS

| | | | |
|---|---|---|---|
| 2,984,370 | 5/1961 | Wade | 414/513 |
| 3,486,646 | 12/1969 | O'Brien et al. | 414/513 |
| 3,720,328 | 3/1973 | Mackenzie | 414/513 |
| 3,901,394 | 8/1975 | Bowles | 414/513 |
| 4,616,879 | 10/1986 | Booher | 296/184 |

*Primary Examiner*—Robert R. Song

[57] ABSTRACT

A refuse compactor body has a tank section of an irregular polygonal right section that is uniform from end to end. The tank wall is made of rectangular pieces of thin very high tensile strength sheet metal and externally reinforced at spaced intervals longitudinally of the tank by polygonal peripherally continuous girth reinforcements, made up of straight short sections of metal tubes, to make a semi-monocoque structure. A floor portion of the tank is recessed between the longitudinal body support beams, which are the sole body support, to provide a relatively low center of gravity when mounted on a truck chassis. A hopper section of the body has a packer that obtruates about two-thirds of the opening to the tank and is fitted at its upper edge with a follower that pivots to a shallower slope to keep refuse from falling behind the packer blade during a compaction stroke of the packer. In a fully extended position, the upper edge of the packer does not penetrate the tank entrance and so avoids excessive stresses on the tank roof at the entrance. In a retracted position of the hopper, the follower and the packer together define a sloping surface to deflect refuse towards the packing face of the packer.

6 Claims, 13 Drawing Figures

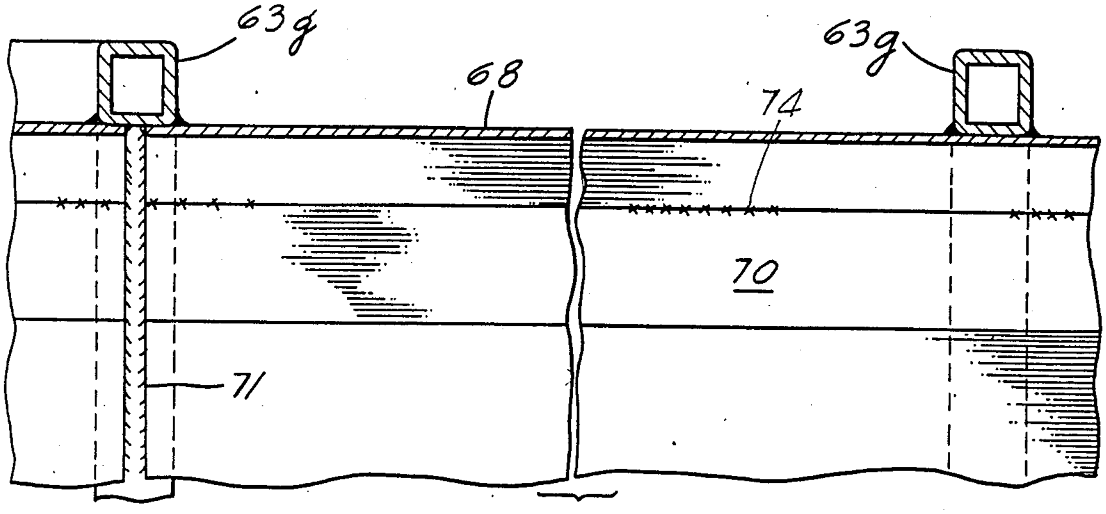
FIG. 3
FIG. 5
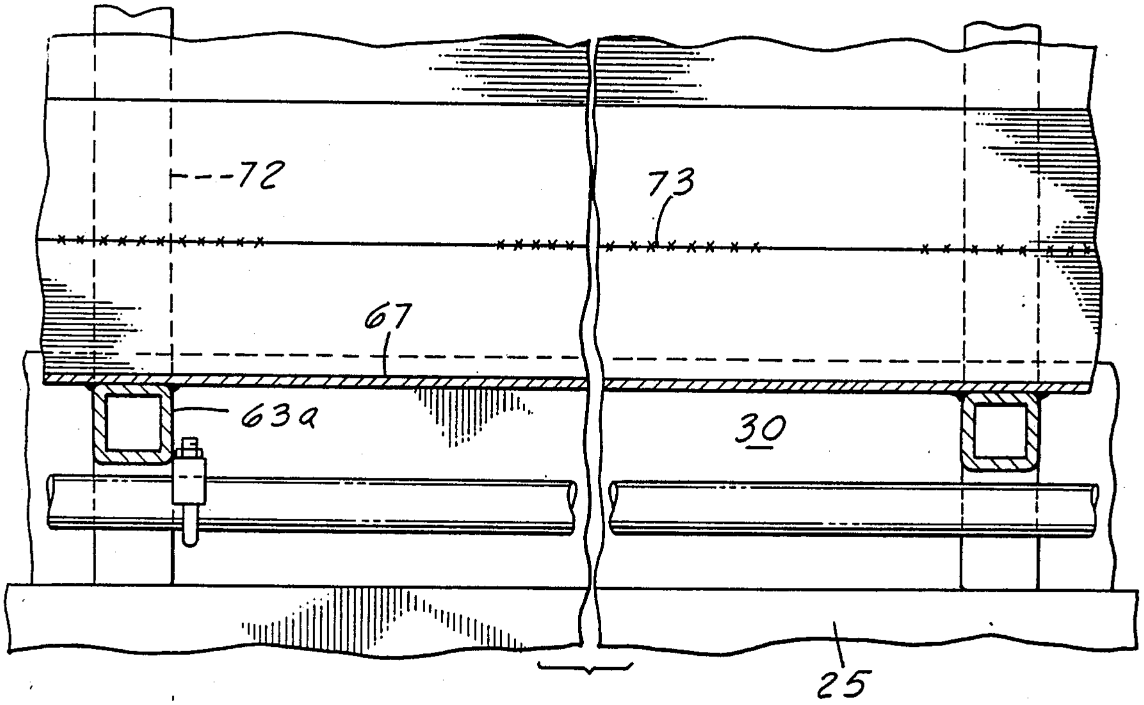
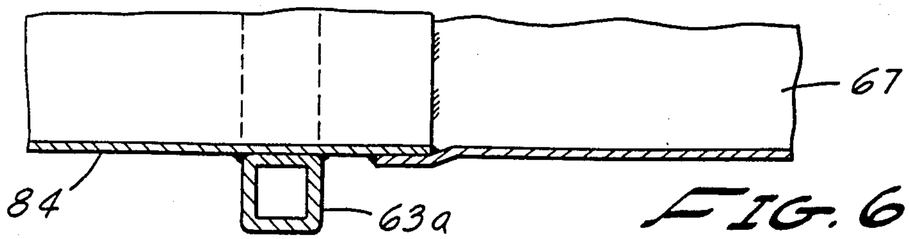
FIG. 6

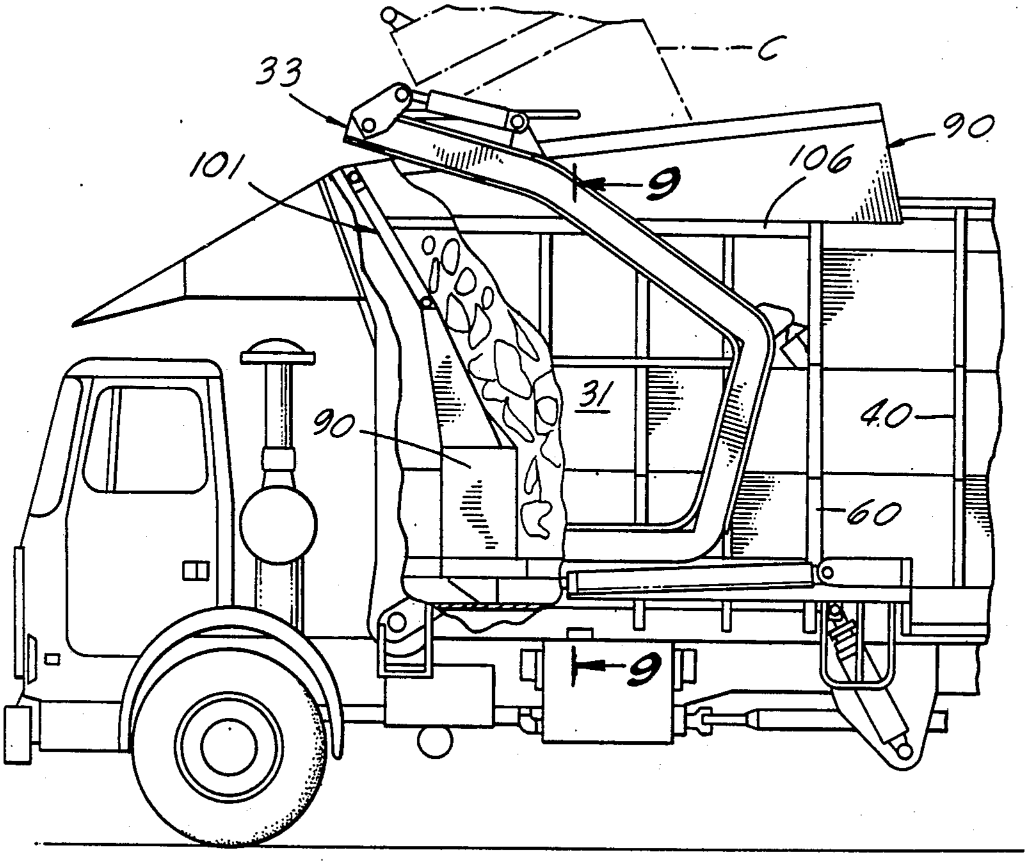
FIG. 7
FIG. 8
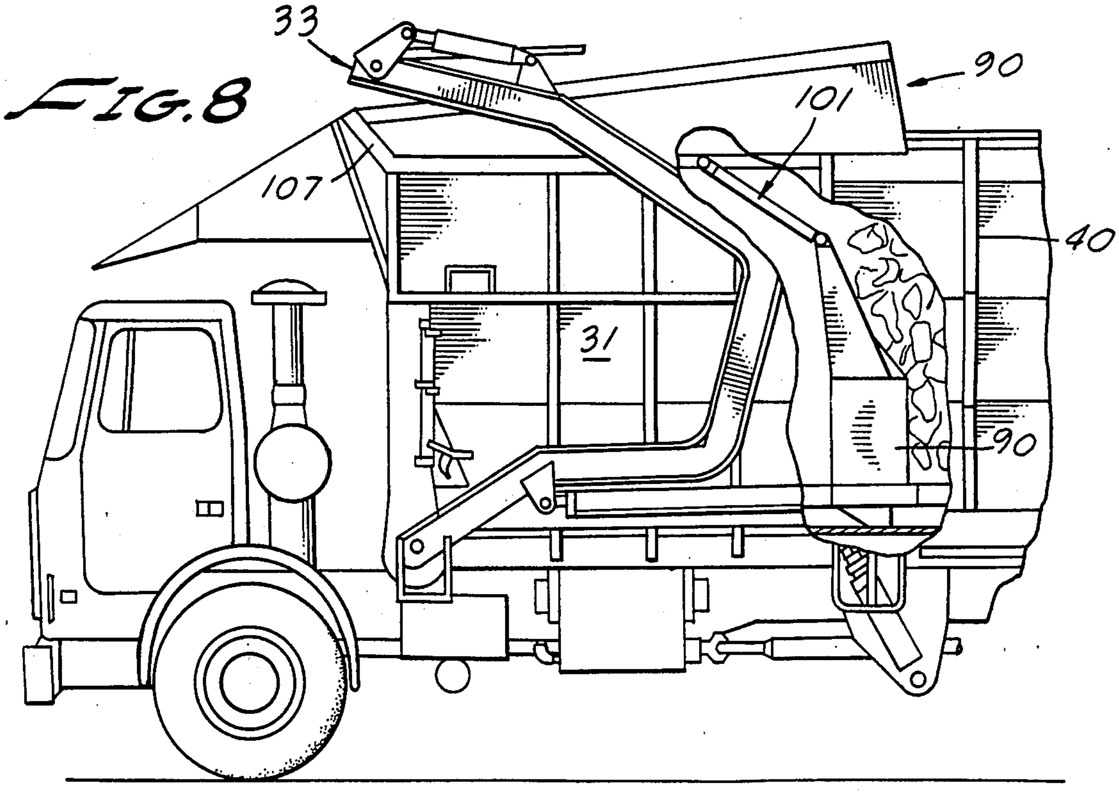

40
60
70b
70e
70a
70d
70c
70a
110
111
67
6
6
11
11
88
87
87
90
106
107
105
102
103
96
100
95
90
108
92
91
93
94
84

REFUSE PICKUP AND COMPACTOR BODY

This is a division of application Ser. No. 754,521 filed July 12, 1958, now U.S. Pat. No. 4,648,775.

BACKGROUND OF THE INVENTION

The present invention relates to bodies for refuse pickup trucks and, more particularly, to an improved body incorporating a hopper, a reciprocable packer within the hopper and a refuse collection and compaction tank whose forward end opens into communication with the hopper.

Refuse pickup trucks commonly comprise a truck chassis fitted with a body that is made by a manufacturer other than the maker of the chassis. Federal and local laws impose legal limitations on the gross weight and dimensions of the fully loaded vehicle. Thus, the body builder is commonly faced with the problem of designing a refuse compactor body that will carry the largest possible legal payload within the confines of the body size and gross vehicle weight limits imposed by these laws, so that the refuse hauler will avoid the severe fines imposed on violators, especially of the weight laws.

In the past, in order to maximize the volume of refuse carried per unit of length of the refuse truck, a quadrangular cross section of tank has been commonly used, sometimes to the full width and height allowed by the law. In a variation of the rectangular cross section body, the upper outside corners of the body or tank have been beveled into a six-sided shape. Recognizing that a circular cross section is structurally more efficient than a quadrangular section, some body builders have devised cylindrical refuse compactor bodies. However, these are wasteful of the legally available height and weight and thus inefficient in terms of maximum utilization per unit length (and weight) of the truck chassis. Further, in order to withstand the substantial internal packing pressures involved the cylindrical bodies, like the square bodies, require heavy girth reinforcement at spaced intervals along the length of the body which leads to increased manufacturing expense in view of the necessity of making arcuate girth reinforcement members. Another body that has been devised tapers divergently from the front end towards the rear end while having an octagonal cross sectional configuration. This body is essentially a quadrangular body with flattened corners and because of its tapered construction is expensive to manufacture since the girth reinforcement members at spaced intervals along the length of the bodies are of unequal perimeters and the sheet metal panels defining the facets of the body are tapered.

SUMMARY OF THE INVENTION

The refuse pickup and compactor body for vehicle mounting of my invention has a tank of uniform non-tapered right section throughout its length comprising an irregular polygon, preferably of twelve sides. At spaced intervals along its length the tank is externally girth reinforced by a peripheral assembly of short straight box beam members. Each side wall of the tank comprises a purality of sheets of very high tensile steel, e.g., on the order of 100,000 p.s.i., oriented such that the direction of final rolling of the sheet extends circumferentially, each sheet being moderately bent, no more than about 60 degrees, at circumferentially spaced apart locations to provide the desired number of facets for the side walls of the tank. Adjacent circumferentially extending edges of an adjacent pair of metal sheets are spaced apart sufficiently to define a square joint overlapping a corresponding girth reinforcement for continuous seam welding of the edge of each sheet to the corresponding box beam members. The roof and floor panels of the tank comprise longitudinally extending rectangular sheets of metal. The floor and roof panels have opposite side flanges extending longitudinally, bent no more than about 15°, the bend lines being aligned with the final direction of rolling.

A bubble or clam shell door of congruent cross section configuration is hingedly connected to the rear end of the tank. A forward end of the tank opens into communication with a hopper section of the body assembly which can be either of the top loading or side loading type. In the case of a front and top loading hopper a right section therethrough is geometrically similar to the multifaceted tank except for an upper chute portion, the opposite sides of which constitute a vertically upward extension of the extreme outside opposite side walls of the hopper. The underside of the body and hopper are supported on a laterally spaced pair of longitudinally extending box beams. The polygonal cross sectional configuration of the tank and hopper are so proportioned to the spacing between the support beams that a facet of the cross sectional configuration constituting the floor of the tank and hopper is located lower than the upper face of the supporting beams. The hopper section is fitted with a packer of cross sectional configuration matingly receivable within the hopper. The packer has a solid packing face whose upper edge terminates short of the roof of the tank. A packer follower blade is hingedly connected to the upper edge of the packer and has its upper edge guided in tracks such that when the packer is in the retracted position the blade follower is erected to constitute substantially a continuation of an inclined upper edge portion of the solid packer.

BRIEF DESCRIPTION OF THE DRAWINGS

FIG. 3 is a partial sectional view, on the line 3—3 of FIG. 2, showing details of construction for the roof of the tank portion of the body.

FIG. 5 is a sectional view, taken on the line 5—5 of FIG. 2, showing details of construction of the floor of the tank.

FIG. 6 is an enlarged view of the area 6 of FIG. 10.

FIG. 7 is a partial side elevational view of the vehicle of FIG. 1, on a larger scale, with a portion of a side wall of the hopper portion of the body cut away to show the packer blade in a retracted position.

FIG. 8 is a view like FIG. 7 but with a different portion of the hopper side wall cut away to show the packer blade in a fully extended position.

DESCRIPTION OF THE PREFERRED EMBODIMENT

Figure 1:
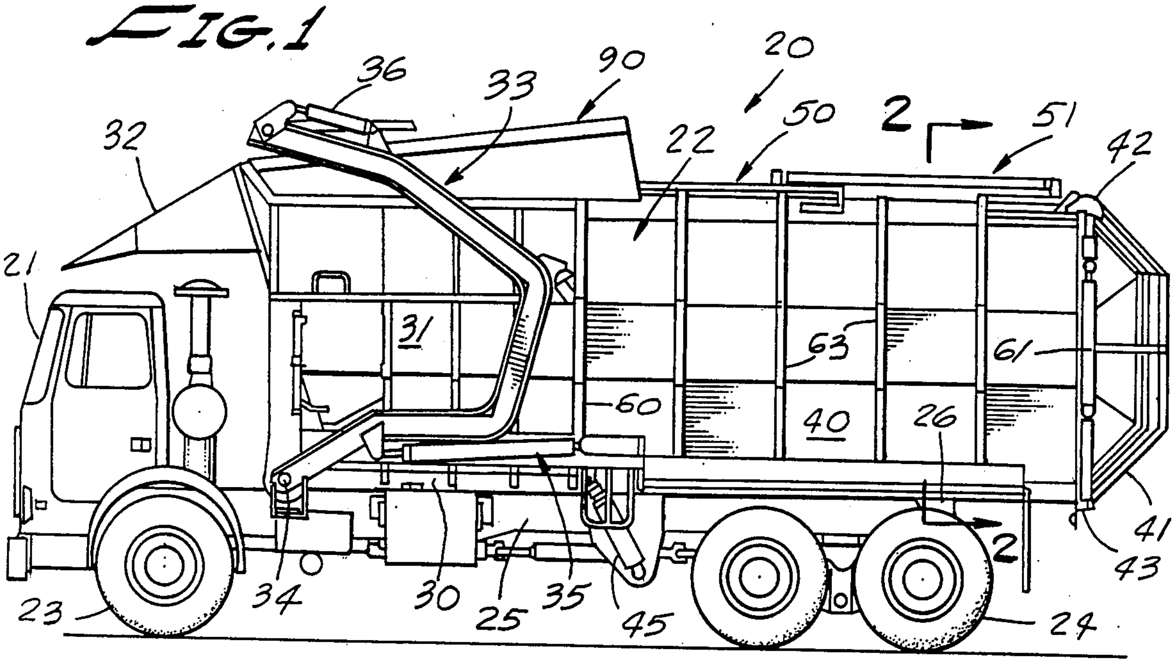
FIG. 1 is side elevational view of a refuse pickup vehicle comprising a truck chassis fitted with a refuse compactor body of the front loader type embodying my invention.

Before explaining the invention in detail, it is to be understood that the invention is not limited in its application to the materials or details of construction and the arrangements of the components set forth in the description or illustrated in the drawings. The invention is capable of other embodiments, e.g., side loader bodies, and of being practiced and carried out in various ways. Also, it is to be understood that the phraseology and terminology employed herein is for the purposes of description and should not be regarded as limiting.

FIG. 1 shows a complete refuse vehicle 20 comprising a truck 21 on whose chassis a refuse compactor body 22 of the front loader type is mounted. The truck 21 is illustratively fitted with a steerable front axle assembly 23 and a two-axle rear suspension 24 such as are common in the case of refuse vehicles. The frame assembly of the truck includes a laterally spaced apart longitudinally extending pair of rails 25 on which the body 22 is mounted. While the invention is not so limited, in the illustrated case the refuse body 22 is pivotally hinged adjacent its rear end and on its underside to the rear end portions of the pair of truck frame rails 25, as by a hinge means 26.

Figure 4:
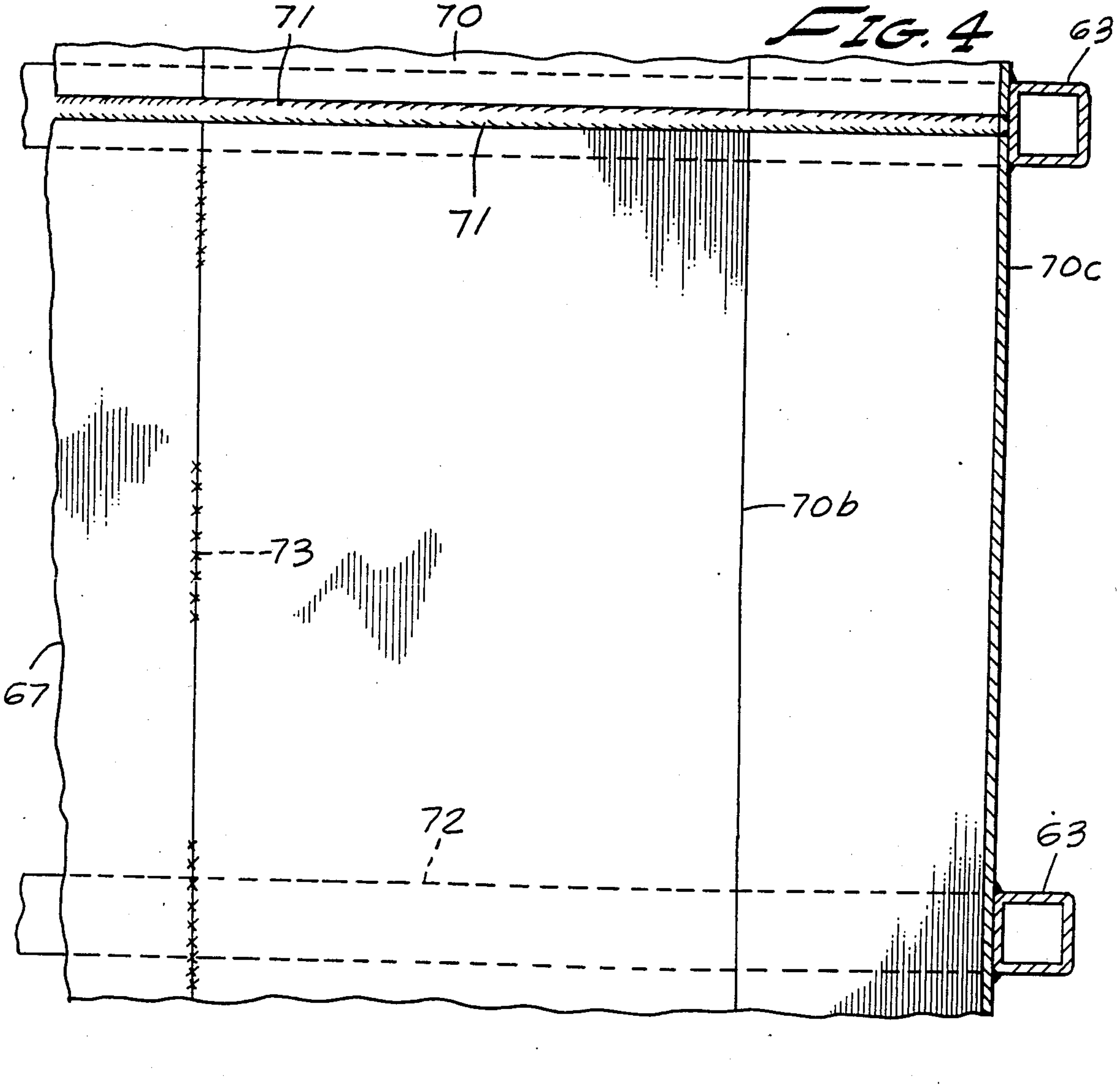
FIG. 4 is a partial sectional view taken on the line 4—4 of FIG. 2, showing details of construction of the sidewall of the tank.

Throughout its length the body 22 is supported on its underside by a laterally spaced apart essentially parallel pair of box beams 30, both of which are hingedly interconnected at their rear ends to the chassis rails 25 by the hinge means 26. As shown in FIG. 4, the beams 30 normally rest on top of the rails 25 throughout their length. The forward end of the body 22 comprises a hopper and compactor section 31 whose upper and forward side is fitted with a protective canopy assembly 32 that extends over the cab of the truck 21. A pair of lift arm assemblies 33, of generally U-shape configuration are mounted on opposite sides of the hopper section 31. Each of these is pivotally interconnected, as at 34, to a rigid framework including the front end of the hopper and of the body support beams 30. A hydraulic cylinder mechanism 35 is interconnected between each of the lift arms 33 and a fixed location on the body 22 for synchronously pivoting the pair of lift arms 33 about their pivot axes 34. At its swingable end each lift arm 33 is fitted with a hydraulically actuable fork mechanism 36. With this lift arm arrangement a container C can be picked up at ground level from in front of the refuse vehicle and swung up and over to a position to be inverted for dumping its contents into the hopper 31, as schematically illustrated in FIG. 7.

Figure 13:
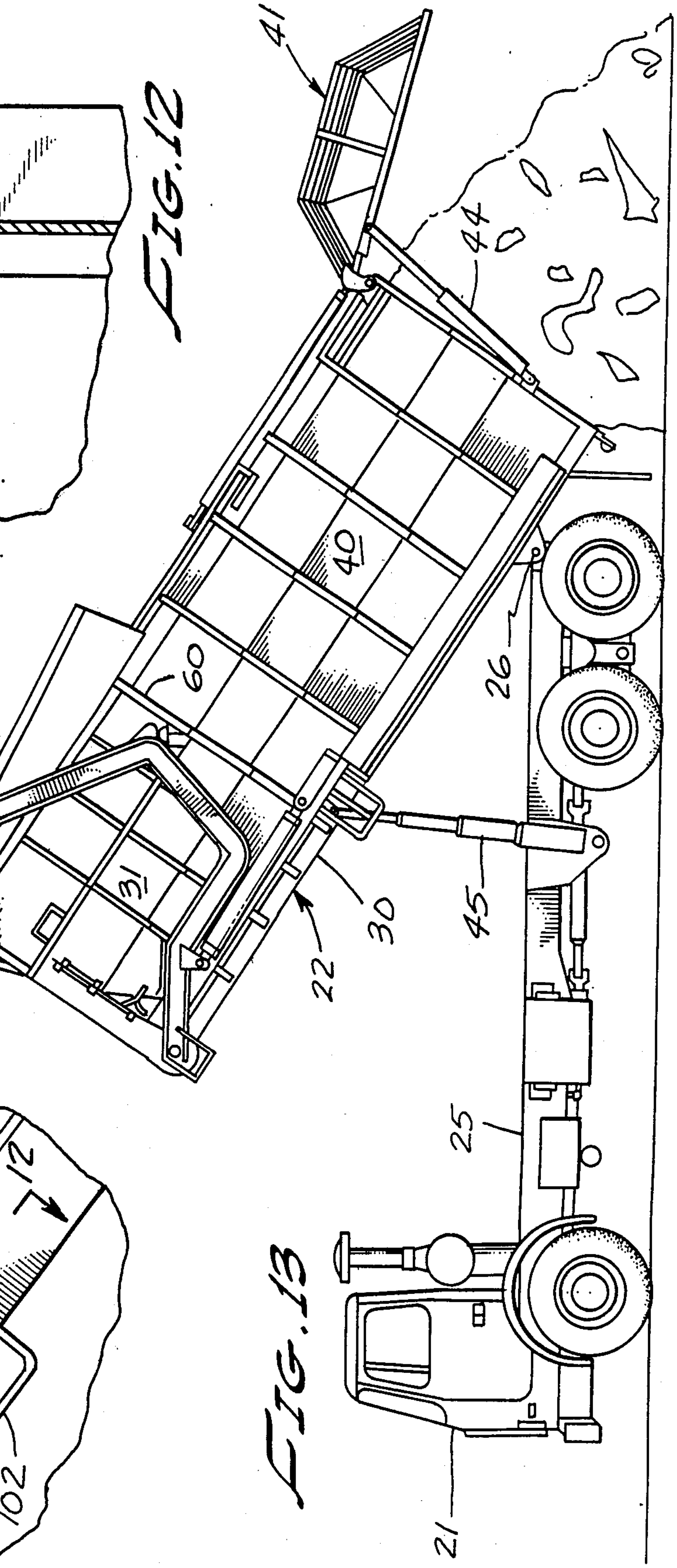
FIG. 13 is a side elevational view of the vehicle of FIG. 1 but showing the refuse body in a tilted position for evacuating a load of compacted refuse therefrom.

The rear portion of the body 22 comprises a tank section 40 whose rear end is normally closed by a clam shell door 41. While not illustrated in detail it will be understood that the upper edge of the door 41 is hingedly interconnected to the top side of the tank section 40 by hinge mechanisms 42 but normally held in closed position by a latch mechanism 43 interconnecting the bottom edges of the door and tank section. As is best seen in FIG. 13 a hydraulic mechanism 44 is interconnected between the door 41 and the framing of the rear end of the tank section 40 to open and close the door. As is also shown in FIG. 13, another pair of hydraulic mechanisms 45 are interconnected between approximately the central areas of the truck chassis rails 25 and body support beams 30 for tilting the body 22 between horizontal and inclined positions in order to dump refuse out of the body after the door 41 has been opened.

The top of the body 22 is also fitted with a means to open and close the top of the hopper section 31. This means is schematically indicated in the drawings and may take the form of an essentially rectangular panel of an expanded metal screen mounted in an essentially rectangular framework, indicated generally at 50. The opposite side edges of the panel frame are guided in tracks disposed at opposite sides of the body 22. A hydraulic mechanism 51 extends longitudinally along the mid-line of the body 22 on top of the tank section 40 to reciprocate the panel 50 into and out of obturating position with respect to the top opening of the hopper section 31. While not shown, it will be seen that the panel 50 should be configured, in transverse section, to define facets complementary to the underlying facets of the top side of the tank 40.

The tank 40 is assembled from rectangular thin sheets of metal, preferably abrasion resistant steel of very high tensile strength, and a plurality of short straight lengths of stiff reinforcement members, which are preferably square steel tubing. The metal sheets define the walls of the tank while the short straight tube sections circumferentially girdle the tank wall in assemblies at longitudinally spaced apart locations along the length of the tank. The longitudinally spaced apart girth reinforcements are interconnected, otherwise than by the tank wall, solely by the longitudinally extending body support beams 30. Major portions of the sheets forming the skin are oriented with their final direction of rolling extending in a circumferential direction while the roof panel and floor panel metal sheets have their final direction of rolling oriented parallel to the long axis of the tank. As a result, the tank 40 is essentially a stiff semi-monocoque structure in which a substantial portion of the stresses to which it is imposed are absorbed by its skin. I have found that with this arrangement substantial portions of the tank floor framing found in prior art refuse bodies can be eliminated. For the same reason, spacing between the girth reinforcements can be increased, thus resulting in fewer girth reinforcements for a given length of tank body. As a result, thousands of pounds of weight otherwise devoted to providing a sufficiently rigid and durable structure can be devoted to legal payload instead, as compared to prior art structures. My invention also achieves a lower center of gravity for a refuse vehicle on which the invention is applied.

More particularly, referring to FIG. 1, the tank 40 has a front end circumferential girth reinforcement 60 and a similar rear reinforcement 61 made up of short straight lengths of 2 by 3 inch square tubing. At spaced intervals therebetween, depending upon the desired cubic capacity of the tank 40, are a plurality of similar reinforcements 63 of 2 by 2 inch tube sections. As the tank 40 is of uniform cross section from one end to the other, without any taper, it will be understood that the reinforcements 60, 61 and 63 are congruent polygonal shapes.

Figure 2:
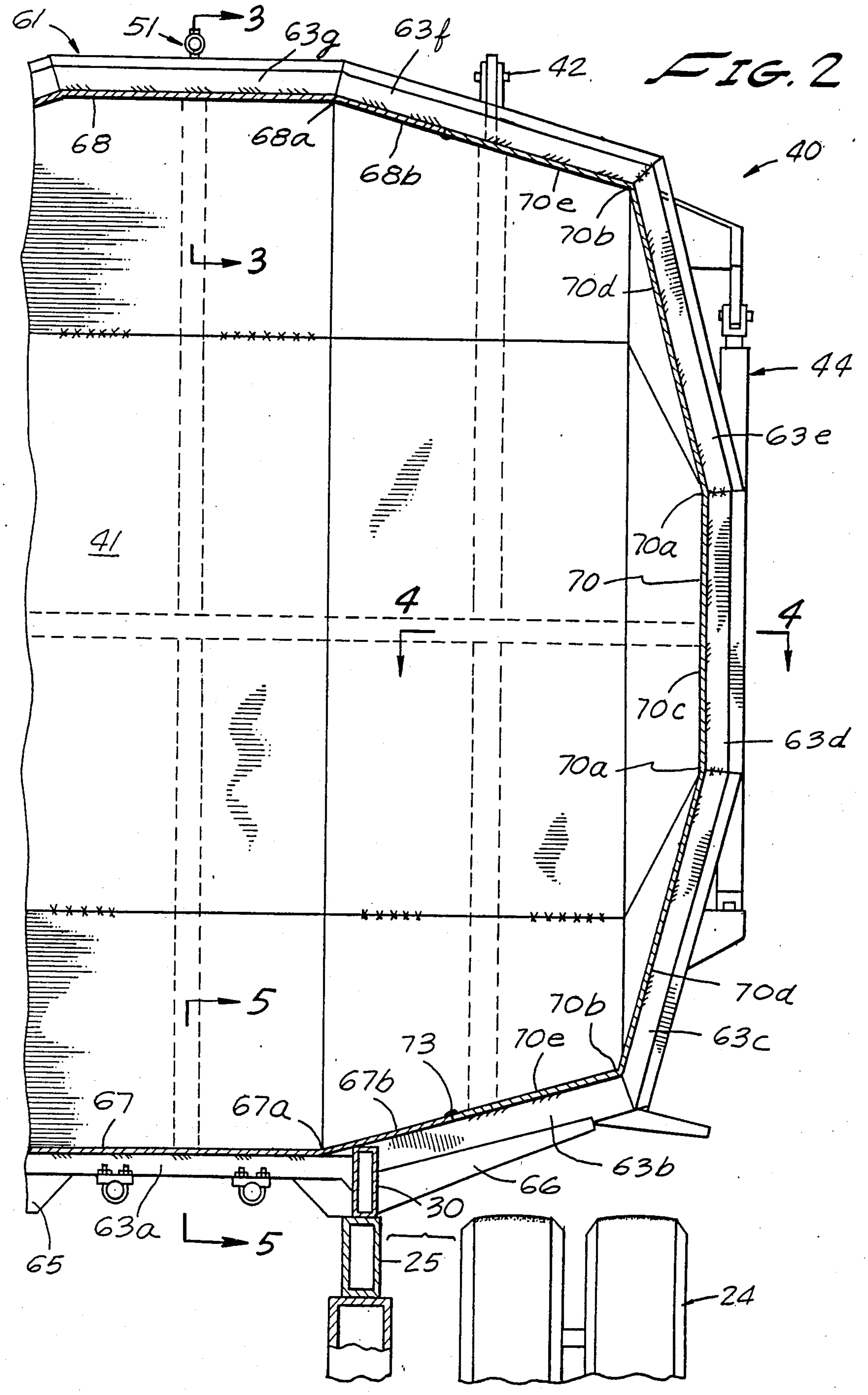
FIG. 2 is a partial transverse cross section of the body and chassis of FIG. 1, taken on the line 2—2 of FIG. 1.

FIG. 2 is a typical cross section through the tank 40, the tank being symmetrical about a vertical central plane. A twelve sided prismatic body is shown as representing the optimum compromise between the greater volume of a square body and the structural efficiency of a circular body shape. The girth reinforcement 63 includes a horizontal floor brace 63*a* having its opposite ends welded to the spaced pair of body support beams 30 on the inside faces of the beams. A box section gusset 65 is preferably welded beneath each end of the floor brace 63*a*. It should be noted that the upper face of the floor brace 63*a* is spaced below the level of the upper faces of the beams 30. The reinforcement 63 also includes short straight pairs of braces 63 *b-f* as well as roof brace 63*g*. As illustrated, these are miter-cut and welded end to end to define the desired polygonal shape. Preferably, each of the pair of braces 63*b* is reinforced by an outrigger gusset 66 welded to its underside and also welded at its inner or root end to an outside face of the corresponding body support beam 30.

The wall of the tank 40 includes a floor panel 67 comprising an elongate rectangular sheet which may be of sufficient length to extend from one end to the other of the tank. The preferred material is steel sheet of about 10 to 12 guage thickness, having a tensile strength of at least 90,000 p.s.i., approximately and, preferably, about 115,000 p.s.i. The panel 67 is oriented with its direction of final rolling oriented longitudinally of tank 40. I have found that this material can be cold bent, with the grain, up to about 15° to define the desired shape of floor panel. On each of the opposite sides of the longitudinal center line of the sheet 67 it is bent upwardly at a corner 67*a* to define a flange portion 67*b*. The spacing between the bend lines 67*a* is such that the underside of the floor panel 67 seats on the upper face of the floor brace 63*a* with the inner surface of the floor panel spaced beneath the level of the upper faces of the pair of beams 30. In the given body shape the flange portions 67*b* of the floor panels 67*a* are thus bent upwardly on the order of 15° to project sidewardly beyond the outer face of the box beams 30.

The tank has a roof panel 68, preferably also preferably made of a single length of an elongate rectangular sheet of the very high tensile thin steel sheet bent 15° along a pair of longitudinal bend lines 68*a* to define a mirror image of the floor panel 67. In the case of both the floor panel 67 and roof panel 68 each is externally skip seam welded to the several spaced apart floor members 63*a* or roof braces 63*g*.

In the section of FIG. 2 the balance of the tank wall, in the void between sidewardly outer edges of the floor panel 67 and roof panel 68, comprises a plurality of sheets of very high tensile strength steel. Each of these sheets is oriented such that its final direction of rolling extends circumferentially and parallel to the braces comprising the girdle reinforcements 60, 61 and 63. These sheets may, if desired, be of a thinner guage, i.e., 14 guage rather than 10 or 12 guage. In either case, I have found that these sheets can be cold bent across the grain up to about 60°, without cracking, in order to achieve the desired shape.

More particuarly, the sheets comprising the side and parts of the top and bottom of the tank comprise rectangular panels 70. Each of these is bent about pairs of bend lines or corners 70*a* and 70*b*, both pairs of bend lines being symmetrically disposed on opposite sides of a transverse midline of the panel extending across the grain. In the illustrated case, the panel is bent substantially 15° at the bend lines 70*a* and substantially 60° at the bend lines 70*b*. There is thus defined in each sheet a vertically disposed central panel 70*c* flanked by a pair of inclined panels 70*d*, each of which terminates in a terminal flange portion, 70*e*.

As is shown in FIG. 4, circumferentially extending edges of an adjacent pair of panels 70 are fitted against an inside face of a girdle reinforcement 63 with the adjacent edges spaced apart sufficiently, e.g., on the order of one-half inch, such that each edge can be independently continuously seam welded to the inner face of the brace 63, as indicated at 71. At the same brace 63 each panel 70 can also be skip seam welded externally. In cases where a panel 70 is of sufficient width, i.e., in the longitudinal direction of the body 40, so that it spans three posts 63, the midportion of the panel 70 can be externally skip welded to the intermediate girdle reinforcement 63, as indicated at 72. As is shown in FIG. 4, abutting edges of each panel 70 and the floor panel 67 are continuously seam welded as indicated at 73, for water tightness. Abutting edges of each panel 70 and roof panel 68 are skip seam welded together as indicated at 74 in FIG. 3.

Figure 9:
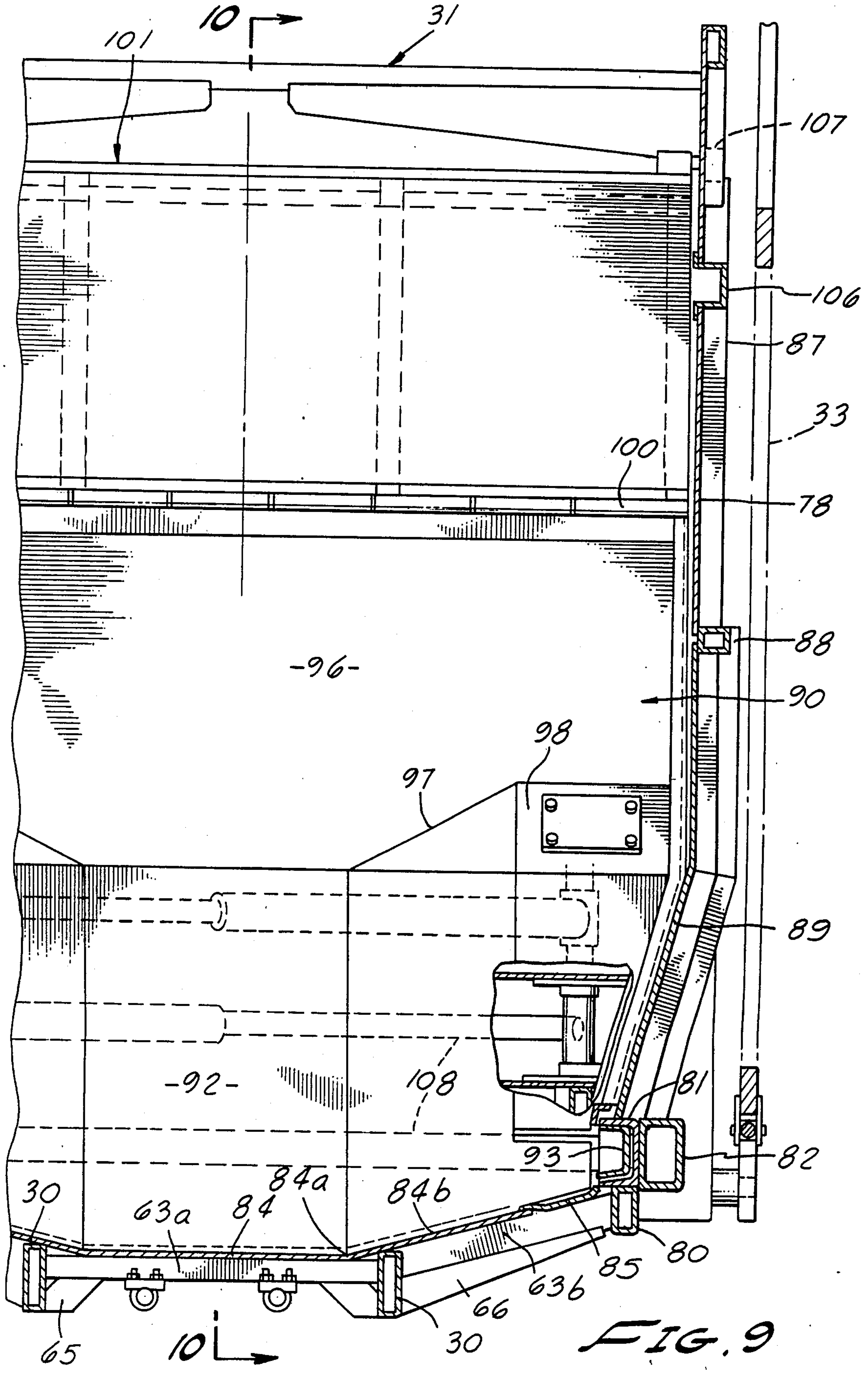
FIG. 9 is a partial transverse cross section through the hopper, taken on the line 9—9 of FIG. 7, showing details of the packer and of the hopper framing.
Figure 10:
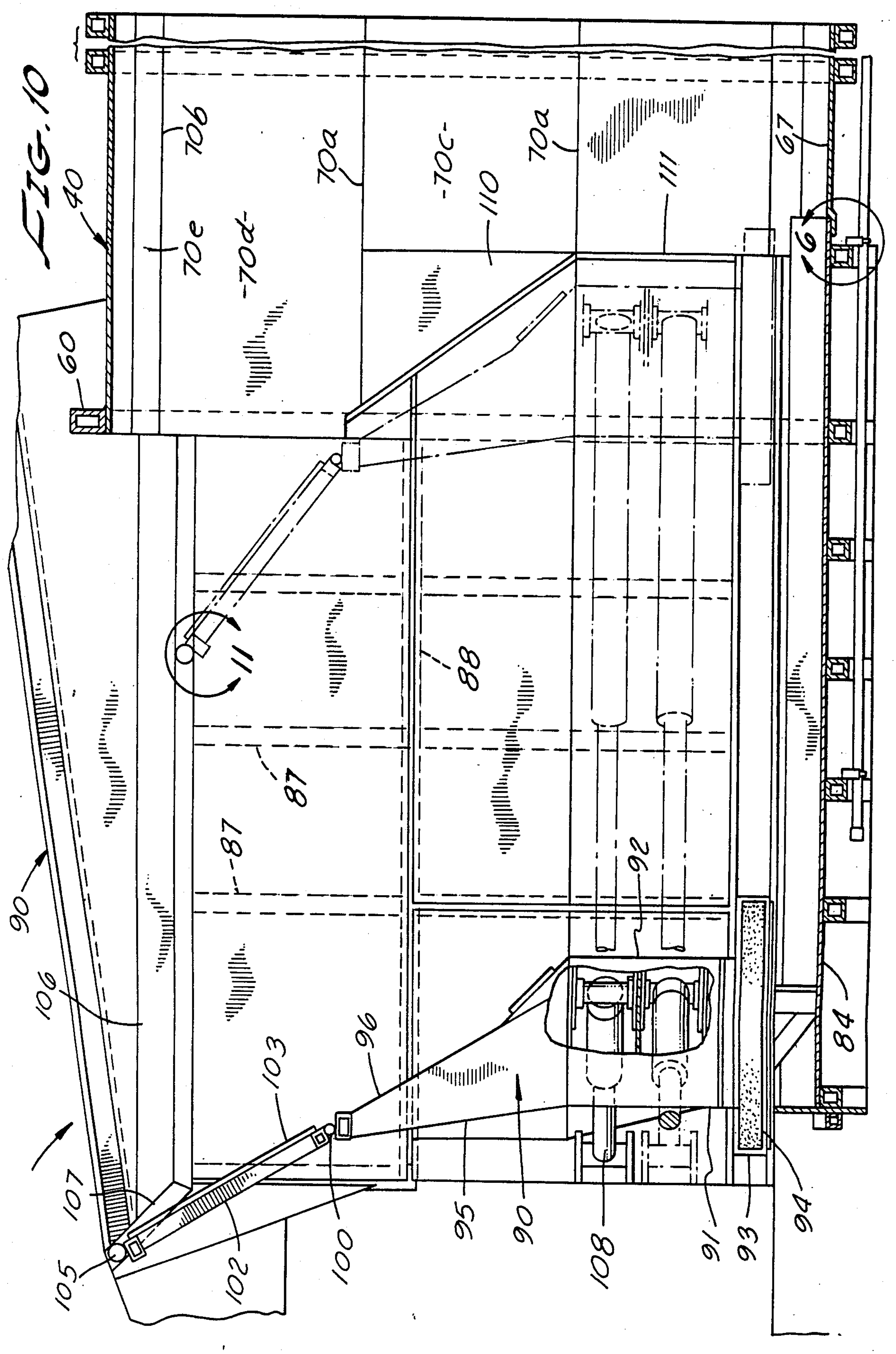
FIG. 10 is a partial sectional view taken on the line 10—10 of FIG. 9.
Figure 12:
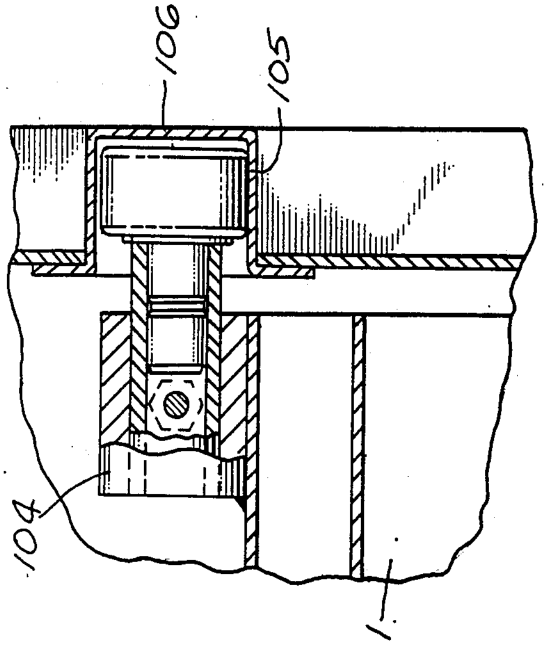
FIG. 12 is a sectional view on the line 12—12 of FIG. 11.
Figure 11:
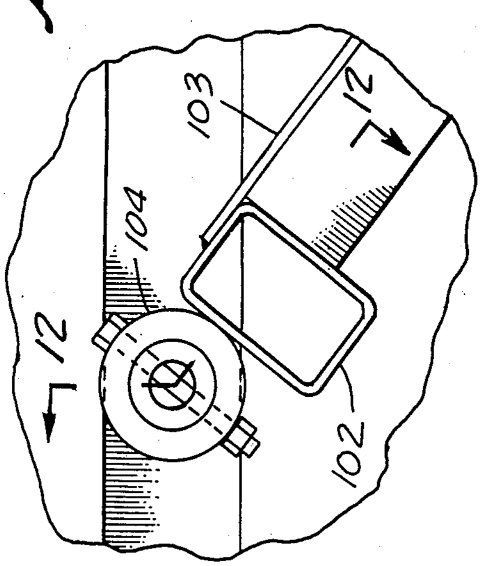
FIG. 11 is a partial elevational view of the area 11 of FIG. 10.

In order to provide sufficient structural support for the door 41, the girth reinforcement 61 at the rear end of the tank is made up of heavier sections of brace tubes around its perimeter. The front reinforcement 60 of the tank is likewise made up of heavier braces or tube braces. Also, as the hopper section 31 is of lesser overwall width than tank 40 in order to accomodate the lift arm mechanisms 33 within the legal width limit of the vehicle, appropriately configured gussets (not shown) are fixed in certain locations at the junction between the rear end of the hopper section 31 and the front reinforcement 60 of the tank. Referring to FIGS. 9 and 10 the framing for the floor of the hopper section includes a spaced apart series of the cross braces 63*a* and outrigger tubes 63*b*, corresponding to the parts indicated by the same numerals in FIG. 2. A box beam 80 is secured to the outer ends of the series of outrigger braces 63*b* extending horizontally for substantially the full length of the hopper 31. Secured to the upper face of each member 80 is a longitudinally extending guide channel 81 also extending substantially the full length of the hopper assembly. As shown in FIG. 9, each channel 81 opens inwardly and on the outside face of its web has another hopper framing box beam 82 secured thereto.

A floor panel 84 is secured to the upper face of the series of cross braces 63*a* in the same manner as previously described with reference to the floor panel 67 of the tank 40. As in the case of the tank, the hopper floor panel 84 is also preferably made of a very high tensile steel sheet folded along corners or bend lines 84*a* and defining opposite side flange portions 84*b*. The gap between the opposite side edge of the flange portions 84*b* and the adjacent guide channel 81 is filled with a sheet metal side strip 85. Each side strip 85 may be externally welded to the outrigger 63*b* and have its inner edge continuously seam welded to the adjacent edge of the flange portion 84*b* of the main floor panel.

The remaining walls of the hopper section 31 are made up of rectangular sheet metal and square tube reinforcements in a manner well understood in the art. Suffice it to say that opposite side walls of the hopper are fitted with longitudinally spaced apart series of post reinforcements 87 to define on each side of the hopper a sidewall configuration as shown in FIG. 9. The upstanding post reinforcements 87 may be horizontally reinforced by a horizontally extending cross member 88. On each side this framework is provided with sheet metal walls to define a vertically upstanding side wall 78 a lower end portion 89 that slopes inwardly at an angle corresponding to the slope of the member 63*c* of FIG. 2. As is well understood in the art, the upper end of the hopper section 31 is fitted with a wind shield structure 90, which is essentially a rectangular frame around the essentially rectangular upper opening into the hopper.

Fitted within the hopper section 31 for axial reciprocation longitudinally thereof is a packer 90. The packer is constructed of preferably steel plate that is internally reinforced by appropriate bracing. As viewed in the profile of FIG. 10 the packer has a rectangular base section 91 defining a substantially vertically disposed packing face 92. As is shown in FIG. 9, the packing face 92 has its bottom and opposite side edges configured to be complementary to the corresponding portions of the hopper floor and lower side walls 89 and therefore to the corresponding portions of the tank walls. On opposite sides of the base portion 90 it is fitted with a channel shaped horizontally disposed shoe 93 of channel shape cross section and each shoe is fitted on its outer face with a wear pad 94 extending longitudinally therealong. The shoes 93 project forwardly beyond the front face 92 of the packer 90 and also extend rearwardly behind the base portion 91. As is shown in FIG. 9, each shoe 93 is nestingly slidably engaged within its companion guide channel 81 whereby the packer 90 can reciprocate through essentially the full length of the hopper section 31.

An upper portion 95 of the packer extends upwardly from and slightly forwardly relative to the base portion 91 and has a rear packing face 96 sloping upwardly at an angle of substantially 30° from the face 92 of the base portion 91. As is shown in FIG. 9, gusset plates 97 and 98 are fitted on opposite sides of the rear face of the packer in planes offset from the planes of the face 92 and face 96 in order to provide internal clearance for internal parts of the packer. As shown in FIGS. 9 and 10 the packing faces 92 and 96 obturate approximately two-thirds of the cross sectional area of the tank 10. That is, the upper horizontal edge of the packer is disposed at approximately the same level as the upper bend lines 70*a* of the tank wall.

A piano hinge mechanism 100 is mounted along the upper edge of the packer 90 to hingedly interconnect a follower 101 thereto. The follower 101 comprises a rigid rectangular framework 102 whose rear face is covered with a rectangular sheet metal plate 103. At each of its ends adjacent a sidewall 88 of the hopper, the follower is fitted at its top with a mounting block 104 to support a roller 105 projecting sidewardly beyond the follower. As is shown in FIG. 10, each side wall of the hopper is provided along its upper edge with a roller guide channel 106 whose forward end develops into an upwardly inclined short roller guide channel 107. As shown in solid outline, when the packer 90 is in the fully retracted position adjacent the forward end of the hopper the roller 105 is confined within the short guide channel 107 to support the rear face of the follower 101 inclined at about 30° relative to the vertical to be essentially co-planar with the sloping face 96 of the packer. When the packer is fully extended as shown in phantom outline in FIG. 10 the roller 105 is pocketed in the horizontally extending guide channel 106 such that it has been inclined to about 55° relative to the vertical. As is shown in the figure, the packer is caused to reciprocate by a pair of crossed hydraulic mechanisms 108 interconnected between the packer 90 and stationary points of the framework of the hopper assembly in a manner well understood in the art.

Several important advantages follow from the packer and hopper construction just described. In some prior art constructions the packer is approximately half as high as the entrance into the refuse tank. In order to keep refuse from falling behind the packer as it is extended, a substantially horizontal follower plate is connected to the upper edge of the packer blade. When the packer blade is retracted the follower is retracted along with the blade into its own pocket, the entrance of which is surrounded with a wiper to prevent entrance of debris into the pocket. As the follower is of relatively large area and comprises a substantial structure to withstand its use, the follower and wiper combination is quite heavy. By contrast the packer and follower of my invention are relatively light in weight and accomplish a weight saving of several hundred pounds. Additionally, since the packer 90 obturates on the order of two-thirds of the opening into the tank its packing efficiency is increased.

In other prior art constructions the packer substantially fully obturates and penetrates into the opening into the tank. Accordingly, substantial forces are imposed on the framing and wall structure of the tank entrance. In the arrangement of my invention, approximately the upper one-third opening into the tank is not obturated and a substantial gap exists between the upper edge of the packer 90 and roof of the tank opening. The packer 90 is shown in phantom outline in fully extended position in FIG. 10 from which it will be observed that the upper edge of the blade does not penetrate the tank opening. At the same time, a major portion of packer 90 below its upper edge fully penetrates the entrance to the tank 40 to a depth of about that of the base portion 91. In this connection, as is shown in FIG. 10, the facets 70*c* and lower facets 70*d* of the tank walls, for an axial length equal to the penetration of the packer 90, are fitted with gussetted plates 110, 111 parallel to facets 70*c* and *d*, respectively, against which opposite sides of packer 90 slide. At the same time, the follower 101 is inclined forwardly and upwardly, now at angle of about 55° from the vertical, and is effective to prevent the refuse being compacted from falling behind the blade. Further, in the fully retracted position of the packer, when the follower 101 occupies the 30° slope indicated in solid outline, the follower 101, the opposite side walls of the hopper section 31, and top front edge of the tank 40 define a relatively large entrance opening for the reception of refuse being dumped in the mode of FIG. 7.

I claim:

1. In a refuse compactor body, the improvement comprising:

- a parallel pair of longitudinally extending floor beams for a tank of the body;
- a plurality of rectangular metal sheets of a high tensile strength including some sheets which have been bent to define a polygonal wall for a tank of said body;
- said tank having at least six flat sides defining a uniform polygonal right section of said tank from end to end;
- a series of girth reinforcements for said wall that are axially spaced apart along the length of said tank;

each of said reinforcements comprising a series of rigidly end-to-end interconnected short straight sections of a stiff material completely peripherally embracing said flat sides of said tank in the same polygonal shape as said wall;

each of said reinforcements being rigidly interconnected with said pair of beams;

said bent sheets having bends on bend lines extending transversely of the direction of final rolling of the sheet;

the direction of rolling of the bent sheet being oriented in the direction of said girth reinforcements;

the maximum angle of bend of said bent sheets being less than the angle at which a sheet of the guage and high tensile strength of the sheet would crack at the line of bending during cold bending.

2. A refuse compactor body as in claim 1 in which:

said plurality of sheets includes one sheet mounted as a floor panel of said tank;

said one sheet being seated on said pair of beams with the direction of final rolling of said one sheet extending longitudinally of said tank;

said one sheet being formed with a pair of flanges extending longitudinally along opposite sides that are bent with the grain of said one sheet at an angle less than an angle at which a sheet of the guage and high tensile strength of said one sheet would crack at the line of bending during cold bending.

3. A refuse compactor body as in claim 2 in which:

each of said girth reinforcements includes a short straight section extending between inner faces of said pair of beams, with the upper face of said section disposed beneath of tops of said beams;

said floor panel being mounted on top of said straight sections with a central area of said floor panel, between said flanges, recessed between said beams.

4. A refuse compactor body as in claim 1 in which:

the tank portion of said refuse body is a semi-monocoque structure consisting of said pair of beams, said girth reinforcements and said plurality of sheets.

5. A refuse compactor body as in claim 1 in which:

said sheets are steel having a guage of 10 to 14 and a tensile strength of at least about 90,000 p.s.i., said maximum angle of bend of said bent sheets being substantially 60°.

6. A refuse compactor body as in claim 2 in which said floor panel is steel having a guage of within the range of about 10 to 14 and a tensile strength of at least about 90,000 p.s.i., said maximum angle of said floor panel being substantially 15°.

* * * * *